May 11, 1965     A. ANSCHERLÍK     3,182,865
REFILLING ARRANGEMENT FOR AN AUTOMATIC BURETTE
Filed Dec. 4, 1963
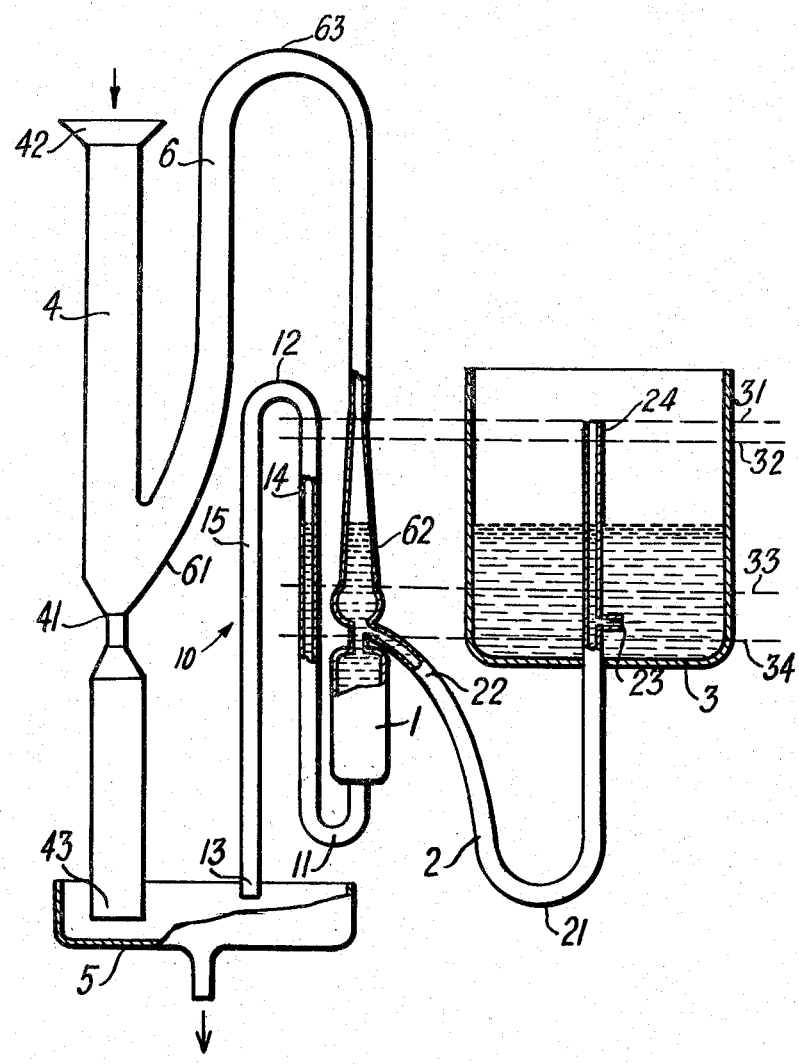
INVENTOR.
Arnošt Anscherlík

United States Patent Office

3,182,865
Patented May 11, 1965

3,182,865
REFILLING ARRANGEMENT FOR AN
AUTOMATIC BURETTE
Arnošt Anscherlík, Prague, Czechoslovakia, assignor to
Výzkumný ústav energetický, Prague, Czechoslovakia
Filed Dec. 4, 1963, Ser. No. 328,033
Claims priority, application Czechoslovakia,
Mar. 19, 1963, 1,540/63
7 Claims. (Cl. 222—416)

This invention relates to automatic equipment for chemical analysis, and more particularly to an automatic burette which is emptied and refilled responsive to a pulse of compressed air.

In known devices of this type, a precisely determined amount of a liquid reagent or the like is discharged from a burette whose bulb is equipped with a siphon tube when gas pressure is applied to the liquid surface in the bulb until the liquid level in the siphon tube is raised above the highest point in the siphon. It has heretofore been customary to refill such burettes automatically after discharge from storage vessels in which a constant liquid level is maintained. The liquid level in the burette after refilling, and the amount of liquid discharged are determined by the liquid level in the storage vessel.

While many devices are known for maintaining a constant liquid level in a storage vessel, there is a need for a device even simpler and more reliable than such known devices as a Mariotte bottle, a float valve, or the like. An air leak may impair the proper functioning of a Mariotte bottle, and float valves are relatively complex devices which are subject to failure on many counts.

The object of the invention is the provision of a storage vessel for a burette of the type described which is free of movable parts, internal spaces sealed from the atmosphere, and similar relatively sensitive and unreliable elements.

More specifically, the invention aims at providing an automatic burette which delivers identical batches of reagent from a storage vessel in which a predetermined effective level is maintained only momentarily.

With these and other objects in view, the invention, in one of its aspects provides a bulb equipped with a siphon, and connected to a storage vessel by a feed pipe. The siphon communicates with the lower portion of the bulb, and the feed pipe with the upper portion. When the liquid level in the siphon is raised above its upper bight portion, the siphon is primed to drain any liquid that may be in the bulb. The storage vessel is so disposed that it may hold liquid to a level higher than the junction of the feed pipe with the bulb. An orifice of the feed pipe is open to the atmosphere in the storage vessel at a level higher than the afore-mentioned junction, but lower than the higher bight portion of the siphon. It is normally above the liquid level in the storage vessel. A bleeder connection between the storage vessel and the bulb has a flow section substantially smaller than that of the feed pipe orifice. The opening of the bleeder connection in the storage vessel should be as low as feasible, but higher than the junction of feed pipe and bulb.

The exact nature of this invention, as well as other objects and advantages thereof will be readily apparent from consideration of the following specification relating to the annexed drawing in which the sole figure shows an automatic burette arrangement of the invention in elevation, and partly in section.

The apparatus illustrated includes the burette proper having an enlarged bulb 1 and a siphon 10 communicating with the bottom part of the bulb 1. The siphon 10 is generally S-shaped. It has a lower bight portion 11 contiguous to the bulb 1, an ascending straight portion 14, an upper bight portion 12, and a descending straight portion 15 terminating in a discharge orifice 13.

A connecting tube 6 having the shape of an inverted U connects the bulb 1 to a pulse generating device 4. The bight portion 63 of the connecting tube 6 is higher than any other portion of the burette arrangement when the apparatus is in the normal operating position illustrated. The tube leg 62 leading from the bight portion 63 to the bulb 1 is narrower than the tube leg 61 which directly communicates with the pulse generator 4.

The latter is a straight, upright tube. Its central portion is connected to the tube leg 61, and the otherwise wide tube 4 has a narrow constriction 41 immediately below the connection. The open top end 42 of the pulse generator is funnel shaped. Its lower end has an open outlet 43. A receiving vessel 5 is arranged below the outlet 43 and the discharge orifice 13 of the siphon for receiving liquid discharge from the pulse generator and from the bulb 1.

The top portion of the bulb 1 is connected to an upwardly open storage vessel 3 by a feed pipe 2 which is bent into an approximate V-shape. The rounded apex portion 21 of the tube 2 is lower than the lower bight portion 11 of the siphon 10, but this is not essential. The junction of the bulb 1 and of the terminal portion 22 of the feed pipe 2 determines the volumetric calibration of the device as will become presently apparent. The tube 2 is sealed into the otherwise closed bottom of the vessel 3 and has an overflow orifice 24 near the open vessel top. A narrow lateral bleeder tube 23 connects the tube 2, and thereby the bulb 1, with the lower portion of the vessel 3.

Certain spatial relationships of the several elements described are critical for the function of the apparatus, and are indicated in the drawing by dotted lines designating horizontal planes. The level 31 of the orifice 24 is lower than the upper bight portion 12 of the siphon. The highest liquid level 32 of the vessel 3 must not be higher than the orifice level 31, and may be slightly lower as shown in the drawing. The lowest operative liquid level 33 in the vessel 3 must not be lower than the orifice of the bleeder tube 23, and the vessel should be refilled when the liquid level approaches the level of the bleeder tube. The bleeder tube 23 should be above the level 34 which is a plane passing through the lowest portion of the junction between the bulb 1 and the terminal feed pipe portion 22.

The apparatus illustrated is operated in the following manner:

A liquid sample to which it is desired to admix a measured amount of reagent solution from the vessel 3 is quickly poured into the funnel shaped top 42 of the pulse generator. The sample must be supplied at a rate greater than the flow rate through the constriction 41. The liquid is backed up until it seals the connection between the pulse generator 4 and the bulb 1, and traps a fixed amount of air in the connecting tube 6. As more sample liquid is poured into the open top 42, and the liquid level above the constriction 41 rises, the trapped air is rapidly compressed and the pulse of compressed air lowers the liquid level in the burette bulb 1.

The displaced liquid rises in the ascending siphon portion 14 and in the communicating connecting tube 2. Because of the very small section of the bleeder tube 23, loss of liquid through the tube is too small to require further consideration. The liquid level 31 is simultaneously reached in the siphon and in the feed pipe, and liquid starts overflowing from the latter through the orifice 24 into the storage vessel before the siphon is primed. Overflowing continues until the liquid in the bulb 1 is depressed to the level 34, whereupon communication between the feed pipe 2 and the siphon is interrupted. At this stage, the burette proper contains a column of liquid whose volume is precisely determined by the configuration of the bulb 1 below the level 34 and that of the adjacent portion of the siphon 10 below the level 31.

Upon further compression of air in the pulse generator 4, the fixed volume of liquid in the burette is lifted above the level 31 in the ascending tube 14, the siphon is primed, and the liquid column is discharged from the orifice 13 into the receiving vessel 5. When the last drop of liquid has been released from the siphon, the air pressure in the burette is released, and liquid can flow back from the vessel 3 into the bulb 1. The bulb is filled to the level of the liquid in the vessel 3. This level in itself is without relevance to the amount of liquid that will be discharged in the next cycle after the first sample was completely drained from the pulse generator 4 into the receiving vessel 5. Filling of the bulb 1 proceeds at a slow rate because of the small section of the bleeder tube 23.

The refilling arrangement for the burette bulb 1 has no moving parts. It is actuated entirely by the pulse of compressed air generated by the rapid admission of a liquid sample to the tube 4. All elements of the apparatus may be fixedly and permanently connected to each other. They need not be disengaged for supplying reagent liquid as in a Mariotte bottle. All seals are rigid and permanent. The entire apparatus is readily assembled from glass parts which are permanently fused to each other. When properly aligned with the direction of gravity, the calibration of the apparatus is permanent. Fine adjustments may be made by lengthening or shortening the feed pipe near the orifice 24.

The bleeder tube 23 affects the precision of reagent discharge to the extent that it reduces the effective hydrostatic head in the feed pipe 2. When the flow section of the bleeder tube 23 is only a small fraction of that of the feed pipe 2 through the orifice 24, and when the orifice of the bleeder tube 23 in the vessel 3 is submersed in reagent liquid, the reduction of the hydrostatic head is insignificant. Moreover, it is practically constant and virtually independent of the actual liquid level in the vessel 3, and may thus be taken into account when the burette is initially calibrated.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. An automatic burette comprising, in combination:
   (a) bulb means for holding a liquid, said bulb means having an upper portion and a lower portion;
   (b) siphon means communicating with said lower portion, said siphon means having a bight portion above said lower portion of the bulb means, and being primable for emptying said bulb means when the liquid level in said siphon means is raised to said bight portion;
   (c) feed pipe means communicating with said upper portion, and defining a junction therewith;
   (d) a storage vessel adapted to hold a supply of liquid to a level higher than the level of said junction, said feed pipe having an overflow orifice at a level higher than said junction and lower than said bight portion;
   (e) a bleeder connection between said storage vessel and said bulb means, the flow section of said bleeder connection being substantially smaller than the flow section of said feed pipe means through said orifice thereof; and
   (f) means for applying gas pressure to a liquid in said top portion.

2. A burette as set forth in claim 1, wherein said bleeder connection has an orifice in said vessel above the level of said junction and substantially below the level of said overflow orifice.

3. A burette as set forth in claim 1, wherein said feed pipe means has a terminal portion communicating with said bulb at said junction and extending downward from said junction, the remainder of said feed pipe means extending upward from said terminal portion.

4. A burette as set forth in claim 1, wherein said storage vessel has a closed bottom and an open top, said feeder pipe passing through said bottom.

5. A burette as set forth in claim 1, wherein said bleeder connection has an orifice in said vessel and communicates with said bulb means through said feed pipe means.

6. A burette as set forth in claim 1, wherein said means for applying gas pressure include a vertically extending conduit having a constriction, and a connecting tube communicating with said conduit above said constriction and sealingly connected to said upper portion above said junction.

7. A burette as set forth in claim 1, wherein said overflow orifice is open to the atmosphere in said storage vessel.

References Cited by the Examiner

UNITED STATES PATENTS

| 2,788,157 | 4/57 | Reynolds et al. | 222—416 X |
| 3,085,717 | 4/63 | Anscherlik | 222—416 X |

LOUIS J. DEMBO, Primary Examiner.

HADD S. LANE, Examiner.